United States Patent Office 3,322,583
Patented May 30, 1967

3,322,583
SOLID PROPELLANT COMPOSITION CONTAINING COPOLYMER BINDER OF ACRYLONITRILE-ACRYLATE
Donald A. Guthrie, Erie, Pa., and James F. Black, Convent, and John F. Kunc, Jr., Union, N.J., assignors to Esso Research and Engineering Company, a corporation of Delaware
No Drawing. Filed July 20, 1964, Ser. No. 383,951
9 Claims. (Cl. 149—19)

The present invention relates to improved solid propellants, particularly high energy solid propellants of the composite type useful in jet propulsion devices such as missiles and rockets. More specifically, the invention concerns a solid propellant composition, comprising an inorganic oxidizing salt and a copolymer of acrylonitrile and at least one ester of acrylic or methacrylic acid, and which has been formed by exposing a suspension of the inorganic oxidizing salt in a liquid mixture of the copolymerizable monomers to high energy ionizing radiation in the absence of a solvent or diluent.

This application is a continuation-in-part of copending application S.N. 23,610, filed Apr. 21, 1960.

In the past, solid propellants have been prepared by mixing polymeric binder components with granular inorganic oxidizers followed by curing or crosslinking the liquid-solid mass with various types of vulcanizing or curing agents such as tri(aziridinyl)phosphene oxides and sulfides at temperatures ranging from 100° to 300° F.

While suitable propellants have been formed in this manner, their preparation is marked by serious processing difficulties. For example, the period of time when the polymer binder components and the vulcanizing agent are mixed, and the temperature at which the materials are mixed must be carefully controlled to insure that the resulting binder has sufficient tensile strength to overcome stresses incurred during transportation and handling and to help the finished propellant maintain its shape during long periods of storage. Further, the fact that temperatures ranging from 150° to 300° F. are ofttimes used with conventional curing systems, presents serious safety problems since the inorganic oxidizer of the propellant system may be accidentally ignited at such temperatures.

Now, in accordance with this invention, it has been found that tough, rubbery polymers suitable as binders for solid propellant applications are obtained at ambient temperatures without the use of chemical curing systems when acrylonitrile is copolymerized in suitable proportions with acrylates or methacrylates in the presence of high energy ionizing radiation and in the absence of solvents since they terminated chain growth and/or prevent crosslinking. The copolymers prepared in accordance with the method described hereinafter are tough, rubbery, essentially insoluble substances that do not soften even when subjected to very high temperatures, e.g. 400° F.

In preparing the novel solid propellants of the present invention, about 1 to 4 parts by weight of a suitable ester of acrylic or methacrylic acid containing from 3 to 20 carbon atoms, preferably 8 to 14 carbon atoms, in the ester group is contacted with about 1 part by weight of acrylonitrile in a polymerization zone at 0 to 150° F. and under pressures of 10 to 100 p.s.i.g. The monomer components of the polymerization mixture should be thoroughly admixed by stirring or shaking prior to polymerization. Mixing the monomers so that a substantially homogeneous mixture is obtained promotes the formation of copolymer and prevents the production of homopolymers.

After the monomer components have been thoroughly mixed, comminuted, high activity salts that readily yield oxygen are evenly dispersed into the monomer mixture to create adjacent oxygen-rich, and oxygen-deficient mixtures. The monomers are then copolymerized by exposing the total mixture to high energy ionizing radiation for a period of time ranging from about 10 seconds to 10 hours or more, depending upon the intensity of the radiation.

The radiation intenstiy, which is measured in roentgens per hour, will vary with the source of radiation and other conditions. It should be between about 10,000 r./hr. and 10,000,000 r./hr. and it will be found that the most useful dose rates are above 100,000 to 200,00 r./hr. The total dosage should be at least 0.1 mr. but not more than 30 mr., preferably the total dosage ranges from about 13.5 to 30 mr. At the completion of the radiation treatment period, a rigidly crosslinked, homogeneous mixture of polymer binder and oxidizer is secured. The irradiated product needs no further curing and with the exception of finishing operations is ready for use.

The polymerization reaction must be carried out in the absence of liquids since they interfere with chain growth and/or reduce crosslinking and thereby prevent the formation of the tough, flexible copolymer binders of the present invention. Moreover, it has been found that the properties of the copolymer are greatly enhanced by the use of substantial amounts of the acrylonitrile monomer. For example, the solubility of the copolymer in benzene is significantly reduced by utilizing amounts of acrylonitrile in the monomer mixture of from about 11 wt. percent to about 20 or 30 wt. percent.

The solid, non-hydroscopic, inorganic oxidizing salts that are useful as oxidizing agents in the present solid propellant compositions include materials such as potassium perchlorate, hydrazine salts, ammonium nitrate, ammonium perchlorate, lithium perchlorate, lithium chloride, and the like. Since the copolymerization may be carried out at substantially ambient temperatures, oxidizing agents that are unstable at elevated temperatures may be admixed with the monomers in suitable proportions to provide a solid propellant in which the polymer is both the binder and the fuel. Monomer-oxidizing salt compositions containing about 60 to 90% by weight, preferably 70 to 90% by weight, of the solid inorganic oxidizing agent serve well as propellants having a relatively high specific impulse. Of course, the amount of oxidizing agent and polymer will have to be adjusted in each instance in order to provide the most efficient propellant mixture.

Additives such as the powders of aluminum, magnesium, silicon, lithium, boron and beryllium used to increase combustion temperature as well as various burning-rate catalysts such as ferrocyanides sold under various trade names such as Prussian blue, Bronze blue, Antwerp blue, Hamburg blue, etc., can be incorporated into the mixture of monomers prior to the radiation polymerization. The solids admixed with the monomers are usually, but need not be, discrete particles having average diameters from about 1 micron to 1 millimeter.

Among the esters of acrylic and methacrylic acid that may be used in the preparation of copolymers of the present invention are the acid esters of $C_3$ to $C_{20}$ straight chain and branched primary or secondary alcohols. The esters coming within the scope of the present invention have the general formula:

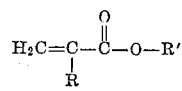

wherein R is hydrogen or a methyl group and R' is an iso- or normal alkyl group having 3 to 20 carbon atoms, preferably 8 to 14 carbon atoms. The alcohols that are particularly suitable for the preparation of the ester monomer are the $C_8$ to $C_{14}$ primary alcohols, such as lauryl alcohol, octyl alcohol and decyl alcohol. Alcohols obtained by the oxonation process from $C_7$ to $C_{12}$ olefins, carbon monoxide and hydrogen are also useful, as well as the alcohols obtained by the hydrogenation of coconut oil. The preferred ester is lauryl methacrylate.

As mentioned above, the polymerization is carried out by exposing the monomers, oxidizers, and other additives to high energy ionizing radiation, that is, high energy quanta (radiation wave length less than 50 A.), neutrons, and charged and uncharged particles of atomic and subatomic nature having energies greater than about 30 electron volts. Types of radiation suitable for the purposes of the invention include high energy electromagnetic radiation such as gamma rays and X-rays and high velocity electrons, as well as beta rays and alpha particles. These types of radiation can be supplied by naturally-occurring radioactive materials which emit alpha, beta and gamma rays or by electrical devices which accelerate charged particles.

Fission by-products of processes generating atomic power, or fissionable materials which emit high energy gamma rays also afford a highly desirable and most abundant source of radioactivity suitable for the purposes of the present invention. These by-products include those with atomic numbers ranging from 30 to 63 and their compounds. They are formed in the course of converting uranium and thorium and other fissionable materials in an atomic reactor. By high energy ionizing radiation is meant radiation from terrestrial sources of sufficient intensity such that the dose rate is at least $1 \times 10^{-4}$ k.w.h./hr./lb. of reactant. This excludes radiation such as cosmic and ultraviolet which are ineffectual for the purposes of this invention.

Materials made radioactive by exposure to neutron irradiation, such as radioactive cobalt-60, which emits gamma rays, can likewise be used. Suitable sources of high velocity electrons are the beams of electron accelerators, such as the Van de Graaff Electrostatic Accelerator. In general, however, high velocity electrons and high energy gamma radiation and its well-known sources such as nuclear fission by-products and materials made radioactive by neutron irradiation, are preferred for the purposes of the invention mainly because of the relatively high penetrating power of the rays and the availability and ease of application of these sources of radiation.

The polymerization is effected in the liquid phase at temperatures below the critical temperature of the monomers and under sufficient pressure to maintain the monomers in the aforementioned phase.

The copolymer binders prepared in the manner described above have tensile strengths of at least 50 lbs./sq. in. and frequently their strengths are above 200 or 300 lbs./sq. in. Besides being strong, they have a surprising amount of elasticity as evidenced by the fact that the minimum elongation of the pure copolymer is at least 20% and in many cases is more than 100%. These clear yellow-amber colored copolymers have extraordinary resistance to many common polymer solvents. For example, they are substantially insoluble at ambient temperatures in solvents such as benzene, hexane, acetone and nitrobenzene. Because of their insolubility in solvents, their molecular weight cannot be determined by conventional techniques. It is estimated that these copolymers have molecular weights as high as $10^7$ to $10^{13}$.

The invention will be better understood by reference to the following examples which are given for illustration purposes only and are not meant to limit the invention.

*Example 1*

In each run described in Table I below, the monomer mixture was placed in a 50 cc. glass vessel and stirred to insure a homogeneous mixture prior to irradiating the monomers at room temperature with a cobalt-60 source. The samples received a total dosage of 13.5 mr. at a rate of 790,000 r./hr. After irradiating each sample at room temperature, the glass containers were broken and the samples were removed and weighed. Each sample was then shaken with 500 cc. of benzene at room temperature for 4 days. The benzene was decanted and the swollen weight of each polymer sample was determined. Then the benzene was evaporated and the residue was weighed to determine the percent soluble in benzene. As indicated in Table I the extent to which the polymer product swells on benzene treatment decreases as the acrylonitrile content of the composition is increased. In each case only a small fraction (4.9 to 8.0%) of the product was soluble in the benzene.

TABLE I

| Run No. | Monomer Mixture | Benzene Swell Test | | Tensile Strength, p.s.i. | Elongation, Percent |
|---|---|---|---|---|---|
| | | Swollen/Dry | Percent Soluble | | |
| 1 | 9 parts by wt. lauryl methacrylate<br>1 part by wt. acrylonitrile | 12.9 | 8.0 | [1] 300 | [1] 100 |
| 2 | 8 parts by wt. lauryl methacrylate<br>2 parts by wt. acrylonitrile | 7.3 | 4.9 | [1] 300 | [1] 100 |
| 3 | 7 parts by wt. lauryl methacrylate<br>3 parts by wt. acrylonitrile | 4.9 | 6.5 | [1] 300 | [1] 100 |

[1] Above.

*Example 2*

Example 1 was repeated with the exception that the monomer mixture was loaded with inorganic solids having various size distributions. In each run the solids-monomer mixture contained 70 wt. percent solids. The inorganic solids and monomers were stirred to obtain a homogeneous mixture and irradiated at room temperature with the same does of radiation. The results are set forth in Table II.

TABLE II

| Run No. | Monomer Mixture | Particle Diameter (microns) | Benzene Swell Test | |
|---|---|---|---|---|
| | | | Swollen/Dry | Percent Soluble |
| 4 | 9 parts by wt. lauryl methacrylate<br>1 part by wt. acrylonitrile | 0.1<br>0.01–0.1 | 2.6<br>3.6 | 5.4<br>5.1 |
| 5 | 8 parts by wt. lauryl methacrylate<br>2 parts by wt. acrylonitrile | 0.1<br>0.01–0.1 | 2.0<br>2.3 | 4.9<br>2.9 |
| 6 | 7 parts by wt. lauryl methacrylate<br>3 parts by wt. acrylonitrile | 0.01–0.1 | 1.6 | 2.1 |

Substantially identical results were obtained with both inorganic solids, showing that the particle size of the solid did not influence the reaction. The product of Run No. 5 had excellent tensile properties, i.e. a tensile strength of 220 p.s.i. and an elongation of 47%.

*Example 3*

Three parts by weight of 2-ethylhexyl acrylate formed by the reaction of 2-ethylhexanol and acrylic acid and 1 part by weight of acrylonitrile are intimately mixed for a period of about 5 minutes. To this mixture is added finely-divided potassium perchlorate and powdered aluminum. The resulting mixture consists of about 75 wt. percent potassium perchlorate, 5 wt. percent aluminum powder, and 20 wt. percent monomer mixture. The mixture is stirred for a period of about 30 minutes under a pressure sufficient to maintain the acrylonitrile in the liquid state. Following the mixing operation, the monomers, oxidizing agent, and aluminum powder are poured into a thin-walled solid rocket motor housing and are exposed at a temperature of about 90° F. to 12 mr. of gamma radiation at a dose rate of about 500,000 r./hr. At the completion of the irradiation treatment, the mandrel is removed from the motor casing and a tough, rubbery mass of binder and oxidizer that strongly adheres to the motor casing is obtained. Upon ignition, the propellant produces low-molecular weight exhaust products thereby securing a high specific impulse.

*Example 4*

Eight parts by weight of octyl methacrylate and 2 parts by weight of acrylonitrile are intimately mixed with finely-powdered ammonium perchlorate whereby the final mixture contains about 86% by wt. ammonium perchlorate. The resulting dough is cast about a mandrel inside a conventional solid rocket motor housing and the complete assembly is exposed at room temperature to 20 mr. of gamma radiation at a dose rate of about 100,000 r./hr. After irradiation the mandrel is removed in the conventional manner. The tough, flexible solid rocket propellant so formed in situ is calculated to be at the stoichiometric composition for the combustion products $N_2$, $HCl$, $H_2O$ and $CO$.

*Example 5*

A necessary characteristic of solid rocket propellants is that the binder material retain its tensile strength after prolonged periods of aging. A sample quantity of the binder material of the present invention was formed by copolymerizing 20 wt. percent acrylonitrile with 80 wt. percent lauryl methacrylate using the irradiation techniques hereinbefore specified. After a period of aging for about 11 years, the polymer binder of the present invention exhibited a tensile strength of 610 p.s.i.

It is not intended to restrict the present invention to the foregoing examples that are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. A solid propellant comprising in combination a tough, rubbery copolymer binder and a comminuted solid inorganic oxidizer salt, said oxidizer being from 60 to 90% by weight of the total propellant composition, said copolymer binder consisting essentially of 20 to 30 wt. percent acrylonitrile and 70 to 80 wt. percent unsaturated ester having the formula:

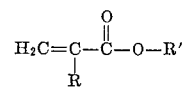

wherein R is selected from the group consisting of hydrogen and a methyl group and R' is an alkyl group having 3 to 20 carbon atoms, and said copolymer binder having a tensile strength of at least 50 p.s.i. and an elongation of at least 20%.

2. The composition of claim 1 wherein said solid inorganic oxidizer makes up about 70 to 90 wt. percent of the total propellant composition.

3. The composition of claim 1 wherein the comminuted oxidizer is ammonium perchlorate.

4. The composition of claim 1 wherein the comminuted oxidizer is potassium perchlorate.

5. The composition of claim 1 wherein the unsaturated ester is octyl methacrylate and the comminuted oxidizer is ammonium perchlorate.

6. The composition of claim 1 wherein the unsaturated ester is lauryl methacrylate and the comminuted oxidizer is ammonium perchlorate.

7. A method of making solid propellants comprising mixing in the absence of a solvent, a monomer mixture consisting essentially of 20 to 30 wt. percent acrylonitrile with 70 to 80 wt. percent of an unsaturated ester having the formula:

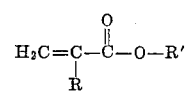

wherein R is selected from the group consisting of hydrogen and a methyl group and R' is an alkyl group having 3 to 20 carbon atoms with a comminuted solid oxidizer salt, exposing said mixture to high energy ionizing radiation of 10,000 to 10,000,000 roentgens/hr. for a total dosage of 13.5 to 30 mr.

8. The method of claim 7 wherein said comminuted solid inorganic oxidizer comprises about 60 to 90 wt. percent of the total mixture.

9. The method of claim 7 wherein the ionizing radiation varies from 100,000 to 200,000 roentgens/hr.

References Cited

UNITED STATES PATENTS

| | | | |
|---|---|---|---|
| 3,005,692 | 10/1961 | Adelman | 149—20 |
| 3,010,355 | 11/1961 | Cutforth | 149—19 |
| 3,055,782 | 9/1962 | Pritchard et al. | 149—20 |
| 3,070,470 | 12/1962 | Argabright et al. | 149—19 |
| 3,084,084 | 4/1963 | D'Alelio | 149—19 |
| 3,150,018 | 9/1964 | Batchelder et al. | 149—19 |
| 3,214,306 | 10/1965 | Colichman et al. | 149—19 |
| 3,255,059 | 6/1966 | Hamermesh et al. | 149—19 |
| 3,258,373 | 6/1966 | Douda | 149—19 |
| 3,268,377 | 8/1966 | Visnov et al. | 149—19 |
| 3,269,880 | 8/1966 | Visnov et al. | 149—19 X |

CARL D. QUARFORTH, *Primary Examiner.*

BENJAMIN R. PADGETT, *Examiner.*

S. J. LECHERT, JR., *Assistant Examiner.*